Sept. 5, 1967 J. P. SCHAFER 3,339,673
VOLUMETRICALLY EXPANDABLE ENERGY ABSORBING MATERIAL
Filed Feb. 11, 1965 2 Sheets-Sheet 1
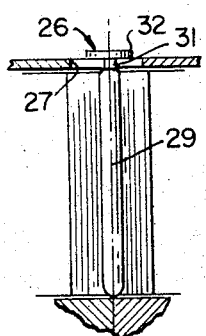
FIG. 4
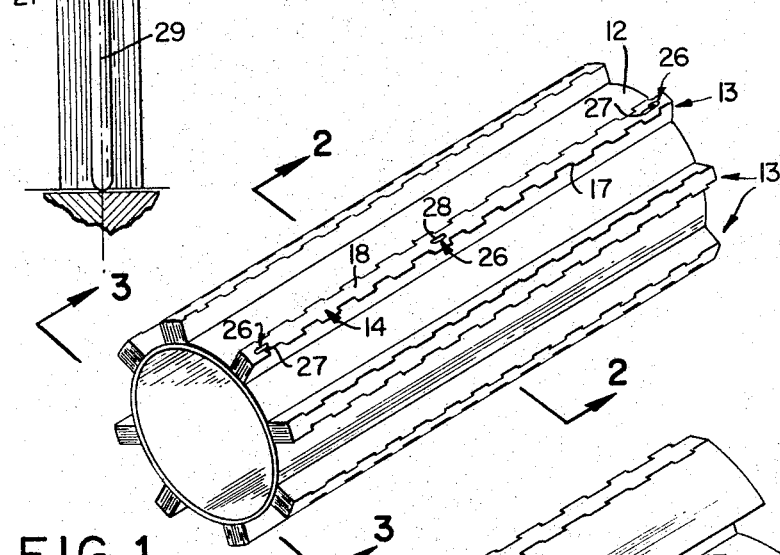
FIG. 1
FIG. 2
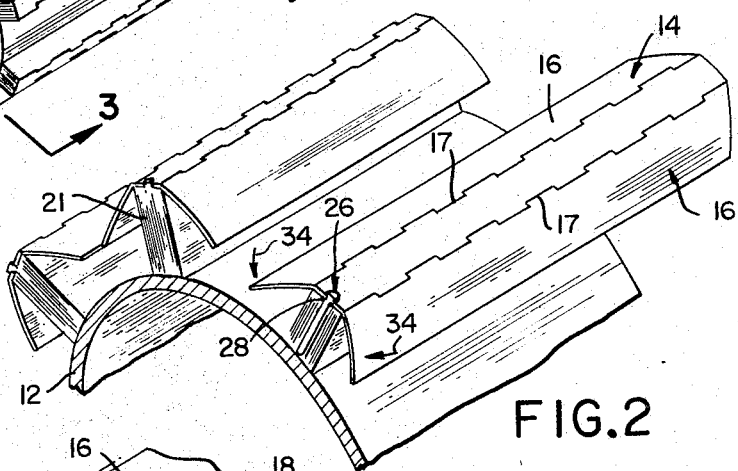
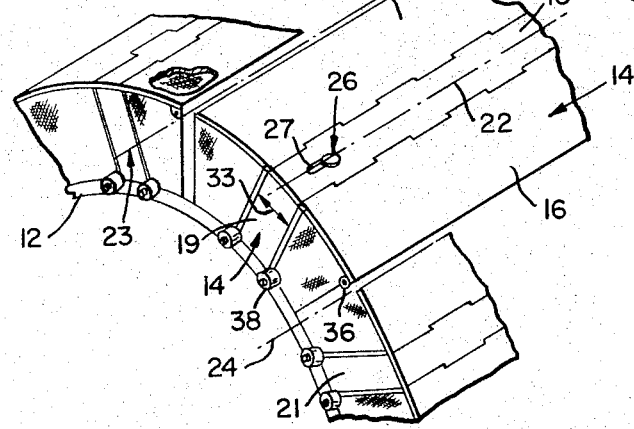
FIG. 3
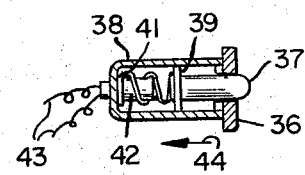
FIG. 5
INVENTOR.
JOHN P. SCHAFER
BY
Townsend & Townsend
ATTORNEYS Sept. 5, 1967 J. P. SCHAFER 3,339,673
VOLUMETRICALLY EXPANDABLE ENERGY ABSORBING MATERIAL
Filed Feb. 11, 1965 2 Sheets-Sheet 2
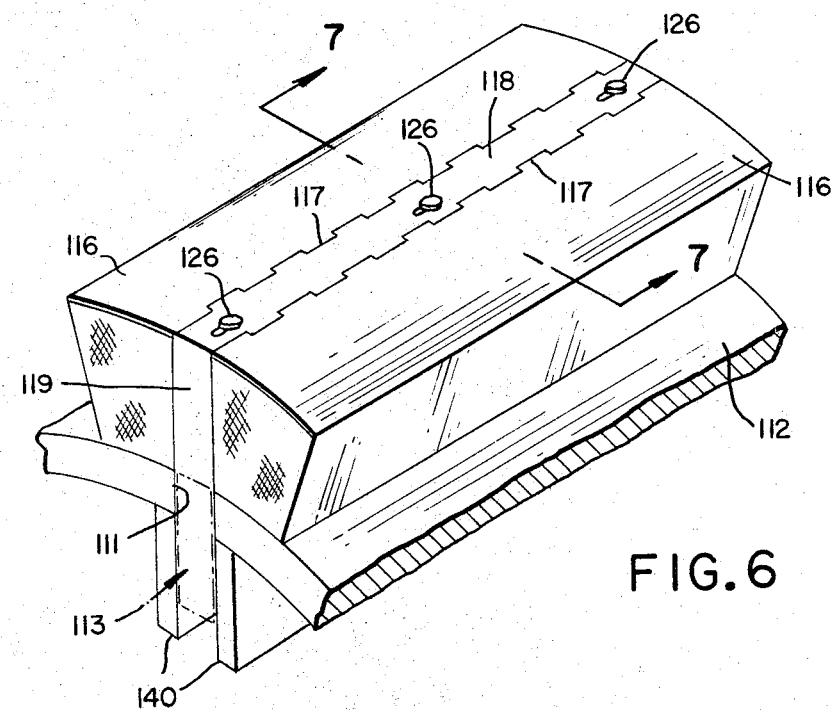
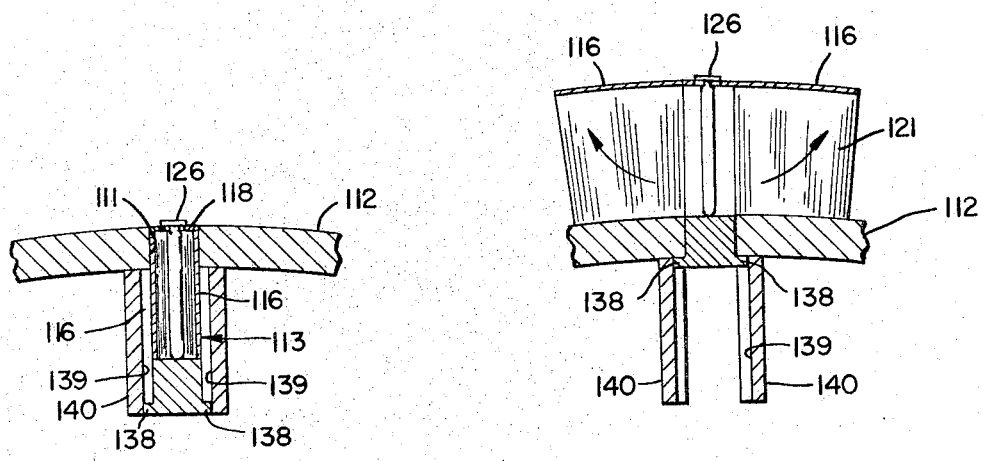
INVENTOR.
JOHN P. SCHAFER
BY
*Townsend & Townsend*
ATTORNEYS United States Patent Office 3,339,673
Patented Sept. 5, 1967

3,339,673
VOLUMETRICALLY EXPANDABLE ENERGY
ABSORBING MATERIAL
John P. Schafer, Orinda, Calif., assignor to Hexcel
Corporation, a corporation of California
Filed Feb. 11, 1965, Ser. No. 431,927
5 Claims. (Cl. 188—1)

This invention relates to a protective device for freely moving bodies designed to minimize the shock of impact or collision with another body, and more particularly to the timed formation of a honeycomb core sandwhich about the surface of the object to be protected just prior to impact.

Under certain circumstances it is desirable to protect an object moving relatively freely against the shock of impact which may be caused when such an object collides with a relatively large and non-resilient body such as the earth's surface. One example of this is found in landing decelerators for articles dropped in aerial delivery systems as shown in the U.S. Patent No. 2,973,172 to Harold W. Bixby entitled, "Radial Cell Decelerator." In the Bixby patent, impact caused by the aerial delivery of cargo to earth is sought to be minimized by the combination of a parachute attached to a platform which supports the cargo during descent and has radially deployed honeycomb attached underneath to cushion the landing impact. This system appears to have application to the delivery of large irregularly shaped objects, such as motor vehicles and the like, but requires a separate landing platform and parachute combination which creates burdens of weight and space to aerial delivery systems normally limited in these respects. Moreover, in Bixby the honeycomb material is deployed radially so that only a relatively small fraction of the honeycomb cells are disposed to absorb the shock of impact with maximum energy absorbing ability.

Another approach to protect moving objects against impact, which may also be applied to aerial delivery systems, is to encapsulate an object relatively permanently with some form of protective covering. However, such a covering permanently attached may be undesirable from a standpoint of space occupancy and its aerodynamic profile during the entire time prior to impact when the protection is not needed.

Thus it is an object of this invention to provide a relatively freely moving object with a volumetrically expandable energy absorbing material attached to a fractional portion of the entire surface thereof with restraining means for maintaining the material in a compacted and non-expanded condition. The energy absorbing material and a portion of the restraining means, after expansion, provide the sole energy absorbing material of the system.

It is also an object to provide apparatus for causing the energy absorbing material to expand volumetrically over nearly the entire surface area of the object to be protected. Means may also be provided to cause this expansion to occur at a predetermined moment of time prior to impact of the object with any relatively large and non-resilient body.

Another object of this invention is to adapt the restraining means of the energy absorbing material to provide an outer facing surface in contact with the energy absorbing material after its volumetric expansion over the surface of the object. In this way the force of impact may be distributed and transmitted through a relatively large portion of the energy absorbing material.

A further object of this invention is to provide expandable honeycomb of the type capable of spontaneous autoexpansion to its open cell form and of being shaped to conform to the contour of the surface of the object to be protected.

Another object of this invention is to provide a protective housing for retaining the expandable honeycomb material prior to its expansion and which occupies only a minor fraction of the entire surface area of the object to be protected. The housing is equipped with hinged flaps which are normally arranged to hold the honeycomb in its unexpanded condition and means for causing the flaps to be released and rotated to an open position at a predetermined signal. When the flaps are released to cause the restrained honeycomb material to expand circumferentially around the object, the expanded honeycomb in combination with the released flaps form an unbonded, single faced, honeycomb cored sandwich.

A feature and an advantage of this invention is that the longitudinal axes of the cells of the expanded honeycomb are substantially perpendicular to the object to be protected, or a plane tangential to such object at the region of import, and the outer covering of the honeycomb sandwich. This assures a relatively high degree of energy absorption by the honeycomb at impact.

Another feature of this invention is that the face of the honeycomb sandwich, after expansion, distributes the force of impact and causes a greater volume of expanded material to absorb the energy of impact.

Another object of this invention is to provide an expandable energy absorbing material which may be stored in spaces formed within and beneath the surface of the object to be protected. In this way, where retractable storage space within the object is available, the energy absorbing material may be stored without causing obstructions on the surface which may be detrimental in terms of storage, handling and shipping prior to use of the energy absorber.

Numerous other objects, features and advantages will become apparent from a reading of the detailed specification of one embodiment of my invention that follows. Reference is also made to the accompanying drawing wherein the same numerals or characters in the several views refer to the same corresponding parts.

Turning now to the drawings:

FIG. 1 is a perspective overall view of a cylindrical object equipped with my invention;

FIG. 2 is a partial sectional perspective view taken along line 2—2 of FIG. 1;

FIG. 3 is a partial perspective end view taken along line 3—3 of FIG. 1;

FIG. 4 is a sectional elevation showing in detail a retaining pin used in my invention;

FIG. 5 is a side elevational detail of the release catch used in my invention;

FIG. 6 is a partial perspective view of an alternate embodiment of my invention;

FIG. 7 is a transverse sectional view taken substantially in the plane of line 7—7 of FIG. 6;

FIG. 8 shows the same components illustrated in FIG. 7, but disclosing the honeycomb energy absorbing mechanism in contracted position relative to the surface of the body to be cushioned.

This invention embraces novel structure designed to protect a cylindrical or other shaped object against the effects of severe impact when suddenly dropped or otherwise made to collide with a solid surface such as the earth or other relatively large and non-resilient body which is relatively immovable with respect to said object. Volumetrically expandable honeycomb material that can be compressed to a relatively small volume, and yet be able to regain its former expanded and contoured shape after being released from its compressed state, is restrained in a series of enclosures which are attached about the surface of the object to be protected. The ability of such volumetrically expandable honeycomb material to regain its expanded and contoured shape may be referred to as spontaneous auto-expansion. Each compacted honeycomb section is retrained between a pair of hinged flaps which in turn are secured to an elongate frame extending for about the full length of the object to be protected. A plurality of such frames containing compacted honeycomb material with restraining flaps are attached at intervals along the outer surface of the object to be protected. By means which release the restraining flaps or lids at a predetermined signal, the compacted volumetrically expandable honeycomb material may be caused to expand and cover the entire surface of the object thus forming, in combination with the extended flaps, a single face honeycomb sandwich. The single face of the sandwich comprises the outer portion of the holding frame and the hinged flaps which may be curved to correspond with the surface of the body being protected immediately adjacent thereto. When the above described structure is caused to function and cover an object just prior to impact with a relatively large, immovable and non-resilient surface, the object itself and any contents therein are reasonably protected against impact damage.

My invention is best understood by referring first to FIG. 1 which shows a cylindrical object 12 to be protected against sudden impact with a relatively large, immovable and non-resilient surface which is not shown. Although I have chosen to show a uniform, symmetrical and cylindrical object to be protected, it is possible to apply my invention to other shaped objects as will be apparent upon the reading of the following specification.

Attached about the outer surface of object 12 are a series of spaced apart honeycomb retaining structures indicated generally at 13. Although I have shown spacing of about equal intervals between the restraining structures, this is not an essential feature of my invention but one of convenience only. Each of the honeycomb retaining structures indicated generally at 13 comprises a fixed portion indicated at 14 and two movable curved flaps or lids 16 secured by means of hinges along upper portion 18. Hinges 17 may be provided with conventional springs, not shown, that normally urge flaps 16 to an open or extended position as shown in FIG. 3. The use of such springs is optional particularly if the honeycomb material being restrained has sufficient expandability force to push the lids into extended position after the lids are released. The lids may be released at the command of a mechanical or electrical signal in a variety of ways, and one such arrangement that I have found satisfactory is described in somewhat greater detail below. A vertical connecting end piece 19 is attached to each end of 18 and is secured by suitable means such as welding to the surface of object 12.

Each structure 13 houses an energy absorbing honeycomb section 21 which is best seen in its compacted form in FIG. 2 and fully expanded in FIG. 3. One energy absorbing honeycomb material that I have found satisfactory for use in my invention is of a type that in its expanded form also may be made to conform to a curved sectional shape, such as object 12 in FIG. 1 of the drawing. Such honeycomb may be made by a number of techniques known in the art although I have found satisfactory that shown in Kazimi's U.S. Patent No. 3,169,898, Curvatured Honeycomb and Method of Making Same. A variety of materials may be used for the ribbon material of the honeycomb section, such as plastics and plastic reinforced cloth, paper, certain types and thicknesses of metal and the like. One material that I have found satisfactory in the use of my invention for high temperature applications is PH 15–7 Mo stainless steel in the form of .002" gage foil. This was used as the ribbon material for ⅜₁₆" cell honeycomb core and imparted with satisfactory spontaneous auto-expansion characteristics by known suitable techniques of heat treating the material in its expanded condition. For cryogenic applications, uses in environments from ambient temperatures down to −423° F., it is believed that ribbon materials such as Mylar will function satisfactorily.

To fabricate the novel structure of my invention, a section of selected honeycomb material in unexpanded form is first expanded in accordance with techniques such as those disclosed in the aforementioned U.S. Patent No. 3,169,898 to Kazimi and then slightly overexpanded so as to impart to the honeycomb the characteristics of seeking its expanded form when released after being compacted and held in place by restraining flaps 16. Each section of material in its expanded form is shaped to fit the contour of the particular portion of the curved object which it is to cover and protect. Each section 21 is also cut to shape so that when all the sections are combined in expanded form, the several sections nearly encase object 12 as shown in FIG. 3 and indicated by the dashed line form of FIG. 1. As shown in FIG. 3 a typical expanded section 21 may extend from center line 22 of upper portion 18 outwardly to line of intersection 23 where contact is made with an adjacent expanded section. In a similar manner the expanded portion of the honeycomb that extends to the other side of center line 22 extends outwardly to line of contact 24 adjacent to the next section of expanded honeycomb material.

With each particular section thus positioned as described above, pins 26 are placed in end slotted holes 27 and center hole 28 down through the center cells of the honeycomb material. Pins 26, as individually detailed and best seen in FIG. 4, comprise body 29, neck section 31, and cap 32. A slotted hole 27 is provided near each outer extremity of portion 18 for the insertion of a pin. The slot is shown in section along its longitudinal axis and is restricted in width to a dimension less than the diameter of body 29. Cap 32 is threadably or otherwise removably secured to the top portion of pin neck 31. A widened portion is provided at the inner edge of slot 27 so that the end pins may be inserted when the honeycomb material is positioned as shown in FIG. 3, i.e. in fully expanded form. The pin at the center of the honeycomb section and fixed portion 18 fits through hole 28 which is not slotted for reasons that will become apparent shortly. Once the pins are in position, and the heads secured thereon, the entire honeycomb section is restrained from shifting or becoming skewed relative to each of the fixed sections indicated generally at 14. The pins in the slotted holes are permitted to move along the slotted portion to compensate for the reduction of width that occurs from the reduction of volume of each honeycomb section as the material proceeds from unexpanded form to expanded form once lids 16 are released and moved to a raised position. The pins are stabilized against rocking by means of the stabilizing groove at the top of the pin formed by the cap spaced away from the shoulder portion of pin body 29 having a narrower neck portion 31 therebetween. The neck portion fits snugly between the long sides of slot 27 causing the pin itself to be restrained from rocking during the honeycomb material's expansion and reduction of width which causes end pins 26 to move along slotted hole 27 by virtue of their presence within particular cells located near the end edges of the honeycomb section.

After each formed honeycomb section is positioned about the object to be protected in the manner as described above, and each of pins 26 have been placed in position, the honeycomb is compressed into the interval between the hinged lids represented by clear width 33 of each portion 19. After compression, the honeycomb sections are restrained to form a compressed pack no wider than dimension 33, and each of hinged lids 16 may be rotated to the down position by being moved in the direction indicated by arrows 34 in FIG. 2. Once the flaps are all the way down and hold the honeycomb material in compacted condition, release catch eyes 36 are in position directly opposite outwardly spring urged pins 37 retained in housing 38 as seen in FIG. 5. At this point, spring urged pins 37 are inserted through each catch 36 in each of the lids to maintain the lids in fixed position restraining the honeycomb section and generally forming the configuration of restraining structures 13 and protected object 12 as shown in FIG. 1.

One release catch mechanism that may be used with my invention is shown in some detail in FIG. 5. Housing 38 is secured by suitable means, such as welding or the like, at the point of intersection between one edge of vertical end piece 19 and the periphery of body 12. Pin 37, which resides in housing 38, is thus in position to enter the eye of catch 36 thereby restraining lid 16 against outward pivotal movement that may be urged either by honeycomb section 21 attempting to assume its expanded shape or by the latter in combination with any spring urging means that may be provided in hinges 17. Pin 37 is provided with flange 39 which bears against a moderately stiff compression spring 41 thereby being outwardly urged to hold catch 36. Also provided within housing 38 is solenoid magnet 42 which may be energized by conductors 43 which are wired to an external electric current source, not shown. When magnet solenoid 42 is energized, a strong magnetic field attracts ferrous metallic pin and flange 39 and causes said pin to move in a direction indicated by arrow 44 whereby catch mechanism 36 is released and flaps 16 urged in a direction opposite to that shown by arrow 34. The several solenoids 42 may be wired together so that a single electrical signal or impulse delivered at a preselected moment of time may cause the release of all flaps 16 simultaneously. Although I have shown and described an electrical release catch mechanism, suitable known mechanical types may be utilized and may be activated by pneumatic, hydraulic, or other appropriate mechanical or electro-mechanical means.

Another variation of my invention is shown in FIGS. 6, 7 and 8. In this embodiment, object 112 to be protected is provided with a plurality of slots, one such slot 111 shown in the fragmentary view of said object in FIG. 6. Within each slot 111, a retaining structure indicated at 113 and shown by broken lines in its retracted position, is disposed and held in place by retainer and catch mechanisms 138 so that fixed portion 118 remains flush with the outer surface edges of object 112. The retaining structure is also provided with flaps 116, end portions 119, pins 126 and hinges 117 which are similar in all respects to those corresponding elements explained in greater detail in the above paragraphs of this application with reference to FIGS. 1–5; and honeycomb material 121, best seen in its expanded form in FIGS. 6 and 7, is held in compacted condition within structure 113 while the latter is in its retracted position as best shown in FIG. 8.

Retainer and catch mechanism 138 may comprise conventional actuators such as solenoid plungers, suitably secured to the structure 113. Upon being energized by an electrical signal at a predetermined moment, the retaining structure indicated at 113 is displaced by the action of the solenoid plunger from its position shown in FIG. 8 to its position indicated above the surface of object 112 and with flaps 116 extended as shown in FIGS. 6 and 7. When the structure at 113 is raised to its extended position, flaps 116, which hitherto have been held in their retracted position to restrain and hold compacted honeycomb material 121, are positioned free and clear of the confinement of the walls of slot 111. At this point, the compacted honeycomb material, and the spring action of hinges 117 if such spring action is necessary and provided, cause the flaps to assume the position shown in FIG. 6, as the compacted honeycomb material expands circumferentially about object 112.

Although I have only shown one retaining structure at 113 and its component parts including honeycomb material 121, it is understood that a plurality of such elements are disposed at more or less uniform intervals over a substantial portion of the surface to be protected of object 112. Moreover, as in the case with the embodiment shown in FIGS. 1–5, the variant I show in FIGS. 6–8 may be applied to a variety of shapes of varying cross-sectional shapes and degrees of symmetry.

Ordinary operation of my invention may be described beginning with the various components in position as illustrated in FIG. 1 with the honeycomb sections compressed and held in compacted condition within the structures indicated by 13 by means of the hinged lids 16 and catch mechanisms 36 held by pins 37. Prior to impact of object 12 with a relatively immovable and non-resilient surface, and upon the occurrence of an electrical impulse through conductors 43 at a predetermined selected moment of time, pins 37 are retracted and lids 16 are caused to rotate to an open position travelling in a direction opposite to arrows 34 as shown in FIG. 2. The outward pivoting movement of flaps 16 is urged either by the force of the expanding honeycomb sections 21 or by independent conventional spring means (not shown) located in the hinges, or a combination of both. Once the lids have completely opened, each of the honeycomb sections 21, which have been preformed to the particular curved shape of the object to be protected, expand as shown in FIG. 3 to form the single face honeycomb core wherein each of the curved lids 16 and upper fixed portion 18 form the outer skin or face of the core. Upon impact of the honeycomb sandwich and protected object with the relatively immovable and non-resilient body, a resultant collision force is produced at the point or points of pressure between the two. This resultant collision force is distributed by the curved, single face of the honeycomb core formed by flaps 16, fixed portion 18, and transmitted to a relatively large portion of adjacent expanded honeycomb material. The resultant collision force, or force of impact, distribtued by surfaces 16 and 18 and transmitted to the honeycomb, is absorbed by compressing the cellular honeycomb cells. A relatively large portion of expanded honeycomb resists the impact force because of the distribution caused by the outer facing, and a relatively large amount of energy and hence impact force may be dissipated in crushing the energy absorbing honeycomb core. This effectively prevents the total resultant force of impact from being imposed directly upon the object protected and its contents, if any there be, which together or individually could be severely damaged by said impact.

Although the foregoing specification describes one embodiment of my invention in some detail, this has been done by way of example for purposes of illustration in order to explain my invention clearly, but is not intended to impose unnecessary restrictions or limitations thereon. Accordingly, it is understood that my invention may be practiced in a number of versions within the spirit of my disclosure and scope of the appended claims.

What is claimed is:

1. A protective cover for cushioning a relatively freely moving object against impact with a relatively large, immovable and non-resilient body, comprising: at least one section of volumetrically expandable and energy absorbing honeycomb material; and a frame secured to the surface of said object for enclosing each said section of material in compacted condition, said frame comprising a top section, a flap section hinged to each side of said top section and held releasably in a closed position to restrain said section of honeycomb in compacted condition and normally urged to an open position to cause the honeycomb to expand volumetrically away from said frame, each said flap section shaped to have uniform contact with the outer surface of said honeycomb section when the flap sections are in the open position and to form a single faced honeycomb sandwich with the honeycomb section; whereby the force of impact with said non-resilient body is distributed by said top section and flaps and transmitted to said energy absorbing honeycomb material.

2. In combination with an object having a relatively large surface area to be cushioned against shock upon impact with another body, volumetrically expandable energy absorbing honeycomb mounted adjacent one portion of said surface area of the object with the axes of the honeycomb cells disposed substantially perpendicular to adjacent surfaces of the object; means for maintaining said material in a compacted non-expanded condition so as to cover only a minor fraction of the entire surface area of the object to be cushioned during a portion of the pre-impact time interval; and means for causing said material to expand substantially over the entire surface area to be cushioned at a predetermined time prior to the moment of impact and with the axes of the honeycomb cells in expanded condition maintained substantially perpendicular to the surface areas of the object which said cells overlie.

3. The combination as defined in claim 2 and wherein said volumetrically expandable energy absorbing material is expandable honeycomb of the type capable of spontaneous auto-expansion to open cell form in conformance with the contour of said surface area to be cushioned.

4. The combination as defined in claim 3 and wherein said means for maintaining said expandable honeycomb in a compacted non-expanded condition comprises flap means having a normal first position operable to restrain said honeycomb against auto-expansion; and wherein said means for causing said material to expand comprises releasable mechanical means operable upon actuation to cause said flap means to move to a second position to permit the honeycomb to expand.

5. The combination as defined in claim 2 and wherein the honeycomb is designed to expand in uniformity with the said surface area to be cushioned.

References Cited
UNITED STATES PATENTS 2,973,172  2/1961  Bixby _____ 188—1 X DUANE A. REGER, *Primary Examiner.*